United States Patent
Kumar Beeram et al.

(10) Patent No.: US 10,310,462 B2
(45) Date of Patent: Jun. 4, 2019

(54) SYSTEM AND APPARATUS FOR SUSTAINING PROCESS TEMPERATURE MEASUREMENT FOR RTD LEAD WIRE BREAK

(71) Applicant: Honeywell International Inc., Morris Plains, NJ (US)

(72) Inventors: Chaitanya Kumar Beeram, Telangana (IN); Sarabjit Singh, Andhra pradesh (IN); Sharath Babu Malve, Karnataka (IN); Anthony F. Digiulian, Chalfont, PA (US)

(73) Assignee: Honeywell International Inc., Morris Plains, NJ (US)

( * ) Notice: Subject to any disclaimer, the term of this patent is extended or adjusted under 35 U.S.C. 154(b) by 401 days.

(21) Appl. No.: 15/147,231

(22) Filed: May 5, 2016

(65) Prior Publication Data
US 2017/0322089 A1    Nov. 9, 2017

(51) Int. Cl.
| G01K 7/00 | (2006.01) |
| G05B 15/02 | (2006.01) |
| G01K 7/20 | (2006.01) |
| G01K 15/00 | (2006.01) |

(52) U.S. Cl.
CPC ............... *G05B 15/02* (2013.01); *G01K 7/20* (2013.01); *G01K 15/007* (2013.01)

(58) Field of Classification Search
USPC ................................................ 374/183, 185
See application file for complete search history.

(56) References Cited

U.S. PATENT DOCUMENTS

| 5,030,849 A | 7/1991 | Brokaw |
| 5,317,520 A * | 5/1994 | Castle ..................... G01K 7/20 374/172 |
| 5,829,876 A * | 11/1998 | Schwartz ................. G01K 7/13 374/1 |
| 5,969,639 A | 10/1999 | Lauf et al. |
| 6,356,191 B1 | 3/2002 | Kirkpatrick et al. |
| 6,614,639 B1 | 9/2003 | Gibbs |
| 9,134,184 B2 | 9/2015 | Kamata |
| 9,172,288 B2 | 10/2015 | Lesmeister et al. |
| 9,173,107 B2 | 10/2015 | Shimizu et al. |
| 9,285,280 B2 | 3/2016 | Faden |
| 9,599,652 B2 * | 3/2017 | Skipper .................. G01K 7/026 |
| 2001/0038661 A1 * | 11/2001 | Mori .................... B62D 5/0496 374/45 |

(Continued)

OTHER PUBLICATIONS

Baker, B. C., "Precision Temperature-Sensing with RTD Circuits," Microchip Technology, Inc. (2008) 8 pages.

(Continued)

*Primary Examiner* — Mirellys Jagan

(57) ABSTRACT

Method and apparatus for sustaining process temperature measurement with respect to a lead wire break. A resistance temperature device can include a group of lead wire arms including lead wire arms of a first lead wire type and a second lead wire type. An operation can occur to automatically switch from a first lead wire type configuration to a second lead wire type configuration in the resistance temperature device having the plurality of lead wire arms including the first lead wire type and the second lead wire type, if one or more wire breaks occurs in one or more the lead wire arms.

14 Claims, 6 Drawing Sheets

(56) References Cited

U.S. PATENT DOCUMENTS

| | | |
|---|---|---|
| 2005/0227526 A1 | 10/2005 | Hopper |
| 2008/0198900 A1 | 8/2008 | Myhre |
| 2008/0279255 A1* | 11/2008 | Burmeister .............. G01K 7/20 374/185 |
| 2011/0203105 A1 | 8/2011 | Ishido et al. |
| 2012/0051399 A1 | 3/2012 | Rud et al. |
| 2014/0056329 A1 | 2/2014 | Alley |
| 2015/0083708 A1 | 3/2015 | Xiang et al. |
| 2016/0063844 A1 | 3/2016 | Schell |
| 2016/0091380 A1 | 3/2016 | Schulte et al. |

OTHER PUBLICATIONS

Hill, G. M., "High Accuracy Temperature Measurements Using RTD's With Current Loop Conditioning," NASA Technical Memorandum 107416, 43rd International Instrumentation Symposium (1997) Orlando, FL, May 4-8, 12 pages.

"Criteria for Temperature Sensor Selection of T/C and RTD Sensor Types," The Basics of Temperature Measurement Using RTDs, Part 2 of 3, Acromag, Inc., Wixom MI, May 2011, 22 pages.

Kester, W. et al., "Section 7 Temperature Sensors," published unknown, 39 pages.

RTD Theory, Pyromation, Inc., published unknown, 6 pages.

\* cited by examiner

| G | H | I | J | K | L |
|---|---|---|---|---|---|
| Wires CD, GH break | Yes, 2-wire RTD measurement | AB | EF | BAEF | $V_{CE} - V_{BF} - V'_{AB} - V'_{EF}$ |
| Wires AB, GH break | Yes, 2-wire RTD measurement | CD | EF | DCEF | $V_{CE} - V_{DF} - V'_{CD} - V'_{EF}$ |
| Wires AB, EF break | Yes, 2-wire RTD measurement | CD | GH | DCGH | $V_{CD} - V_{DH} - V'_{CD} - V'_{GH}$ |
| Wires CD, EF break | Yes, 2-wire RTD measurement | AB | GH | BACEGH | $V_{CE} - V_{BH} - V'_{AB} - V'_{GH}$ |

FIG. 3C

SYSTEM AND APPARATUS FOR SUSTAINING PROCESS TEMPERATURE MEASUREMENT FOR RTD LEAD WIRE BREAK

TECHNICAL FIELD

Embodiments are related to industrial process control and monitoring systems. More specifically, embodiments relate to the measurement of the temperature of a process fluid in such systems. Embodiments further relate to RTD (Resistance Temperature Device) measurement components, circuits and systems, and RTD sensors utilized for temperature measurement. Embodiments are further related to solutions for temperature measurement device wiring failures such as breaks in RTD lead wires.

BACKGROUND

Industrial process control and monitoring systems are used to monitor and/or control industrial processes. For example, a process variable such as pressure, temperature, flow, etc., of a process fluid can be measured by a process variable transmitter. This information allows an operator to monitor operation of the process. Further, the measured process variable can be used as an input to a control algorithm and used to control operation of the process.

In many instances, the process variable transmitter is located at a remote location and transmits information back to a central location over a process control loop. The process control loop can include, for example, a two wire process control loop in which the process variable is transmitted in an analog manner, for example, based upon a 4-20 mA current level flowing through the loop or a digital manner to the central location. The same two wires can be used to provide power to the process variable transmitter. Another example process control loop is a wireless control loop in which data is transmitted wirelessly.

One type of process variable which is measured is temperature. Various types of temperature sensors are used to measure temperature. One type of temperature sensor is a resistance based temperature sensor known as an RTD. The resistance of the RTD varies as a function of temperature. Typically, the resistance is accurately measured using a Kelvin connection to the RTD in which a first pair of wires carry a current and a second pair of wires are used to measure a voltage drop across the RTD. If one of the connections degrades, inaccurate temperature measurements may be obtained and maintenance must be performed.

RTD sensors are thus temperature-sensing devices in which the resistance of an RTD sensor increases with temperature. Regardless of the type of wiring configuration, at times, there may be poor connections on any of the terminals wires, which can lead to measurement errors. In the case of a 3 or 4 wire RTD, when one or more of the 3 or 4 wires of the RTD breaks, the temperature measuring field transmitter enters a failsafe condition and no temperature measurement is provided until the break is rectified. Such as a sensor wire break can negatively impact plant operations, for example, until the break is repaired or dealt with in some manner.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and apparatus for sustaining process temperature measurement for an RTD lead wire break.

It is another aspect of the disclosed embodiments to provide for a method and apparatus for switching from a 4-wire to a 3-wire RTD measurement for a 1-wire break in any arm of an RTD.

It is also an aspect of the disclosed embodiments to provide for a method and apparatus for switching to a 2-wire RTD measurement for a 2-wire break (e.g., one in either arm) of a 4-wire RTD.

It is yet another aspect of the disclosed embodiments to extend the aforementioned concepts to a 1-wire break in a 3-wire RTD.

It is still another aspect of the disclosed embodiments to provide a software-configurable option to control switching operations from a 4-wire to a 3-wire or a 2-wire RTD.

The aforementioned aspects and other objectives and advantages can now be achieved as described herein. In an example embodiment, a method for sustaining process temperature measurement with respect to a lead wire break can include steps or operations for configuring a resistance temperature device to comprise a plurality of lead wire arms including lead wire arms of a first lead wire type and a second lead wire type and automatically switching from a first lead wire type configuration to a second lead wire type configuration in the resistance temperature device having the plurality of lead wire arms including the first lead wire type and the second lead wire type, if at least one wire break occurs in at least one arm of the plurality of lead wire arms of the resistance temperature device.

The resistance temperature device can include a controller that is electrically connected to the plurality of lead wire arms and to a current source via a first switch and to a current sink via a second switch, wherein the controller assists in automatically switching from the first lead wire type configuration to the second lead wire type configuration.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIGS. 3A-3C illustrate a table of broken wire scenarios and measurement solutions, in accordance with an example embodiment.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout. As used herein, the term "and/or" includes any and all combinations of one or more of the associated listed items.

The disclosed embodiments offer a technique to switch from 4-wire to 3-wire RTD measurement for a 1-wire break in any arm of an RTD. The disclosed embodiments also provide for a technique for switching to a 2-wire RTD measurement for 2 wire breaks (e.g., one in either arm) of a 4-wire RTD. The same concept can be extended to a 1-wire break in a 3-wire RTD. Software configurable options can also be implemented to control the switching operation from, for example, a 4-wire to a 3-wire to a 2-wire arrangement.

Figure 1:
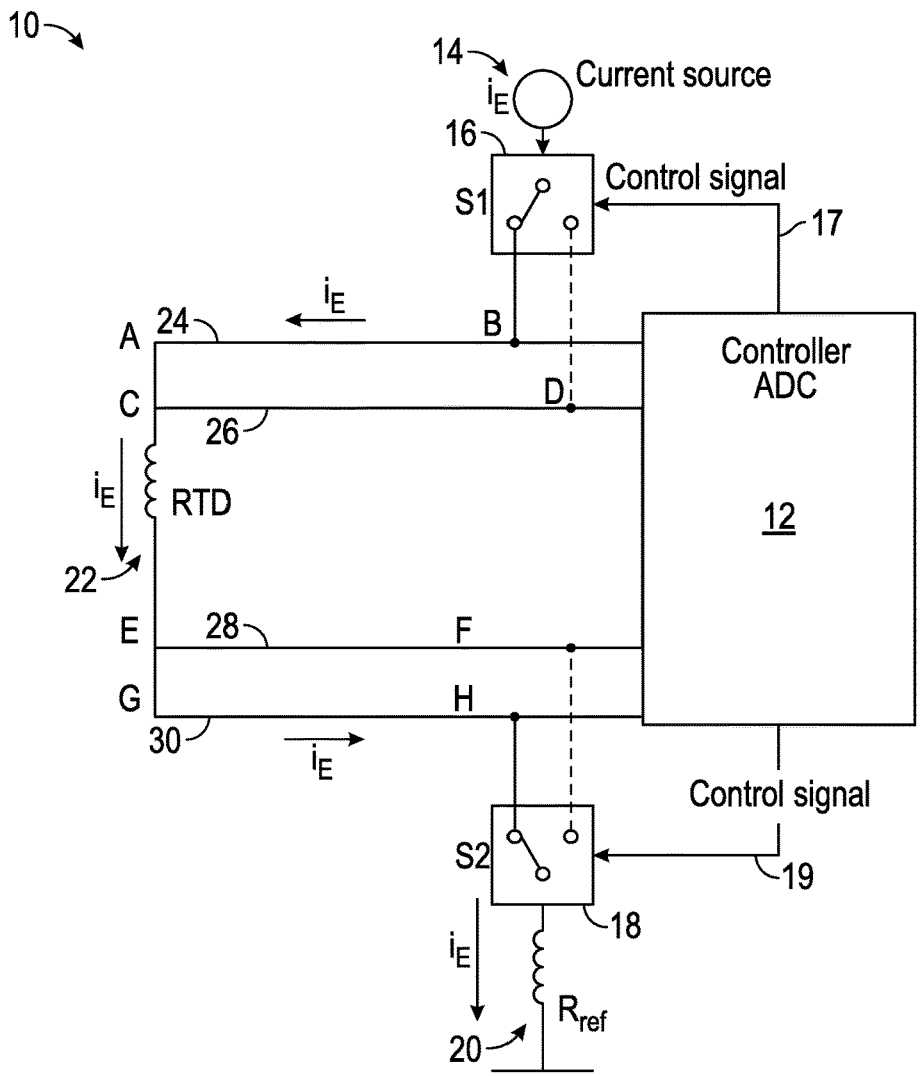
FIG. 1 illustrates a schematic diagram of an RTD circuit, in accordance with an example embodiment.

FIG. 1 illustrates a schematic diagram of an RTD circuit 10, in accordance with an example embodiment. The circuit 10 shown in FIG. 1 represents a circuit for a 4/3/2 wire RTD configuration. The circuit 10 includes a current source 14 that can be connected to an RTD lead wire AB (i.e., RTD lead wire 24) or a lead wire CD (i.e., lead wire 26) via a switch 16 that is also depicted in FIG. 1 as "S1" (i.e., switch S1). A controller ADC (Analog-to-Digital Converter) 12 is connected to switch 16 via a control signal line 17. A current sink 22 can be connected to an RTD lead wire EF (i.e., lead wire 28) or a lead wire GH (i.e., lead wire 30) by a switch 18 that is also depicted in FIG. 1 as "S2" (i.e., switch S2). The controller ADC 12 can be further connected to switch 18 via a control signal line 19. The switches 16 and 18 can be software controlled.

In a 4-wire operation, the excitation current flows through path BACEGH. The voltage drop across DF can be measured by the controller ADC 12, which is further converted to process temperature. The controller ADC 12 can be configured with a multiplexing circuit for the analog inputs B, D, F, and H. The controller ADC 12 can be further configured to host break detection logic capable of detecting breaks in the arms AB, CD, EF, and GH. Circuit 10 can implement an auto switch over from 4 to 3, 3 to 2, 4 to 2, 2 to 4, 2 to 3, and 3 to 4 configuration.

All wires in a 4-wire RTD may not have the same length and same resistance value. If there is a switch from 4 to 3 wire in break scenario, there will be shift in the measured PV value. To avoid this offset, resistance measurement of all 4 wires can be provided.

To initiate lead AB measurement, current source 14 to the AB lead can be connected through switch 16, and the current sink to the GH lead can be connected through switch 18. Leads AB and CD are connected to the controller ADC 12 and excitation current flows through path BACEGH. The voltage drop across BD can be measured by the controller ADC 12, which is further converted to a resistance value that corresponds to lead AB. The voltage $V'_{BD}$ can be measured by a voltage drop across lead AB.

Lead GH measurement can be performed by connecting the current source 14 to the AB lead through switch 16. The current sink connects to GH lead through switch 18. Leads EF and GH are connected to the controller ADC 12. The excitation current flows through path BACEGH. The voltage drop across FH is measured by the controller ADC 12, which is further converted to a resistance value that corresponds to the lead GH. $V'_{GH}$ can be measured by a voltage drop across lead GH.

Lead CD measurement can be performed by connecting the current source 14 to the CD lead through switch 16. The current sink connects to the GH lead through switch 18. Leads CD and EF are connected to the controller ADC 12. The excitation current flows through path DCEGH. The lead wire CD resistance can be measured by subtracting the voltage drop CE from DF. $V'_{CD}$ is measured by the voltage drop across the lead CD.

For lead EF measurement, the current source 14 connects to the AB lead through switch 16. The current sink to the EF lead connects through switch 18. The leads CD and EF are connected to the controller ADC 12. The excitation current flows through path BACEF. The lead wire EF resistance can be measured by subtracting the voltage drop CE from DF. $V'_{EF}$ is measured by the voltage drop across lead EF. These values are used for compensation to maintain the accuracy in process temperature measurement when a switch over occurs from a 4 wire to a 3 wire or to a 2 wire arrangement.

Figure 2:
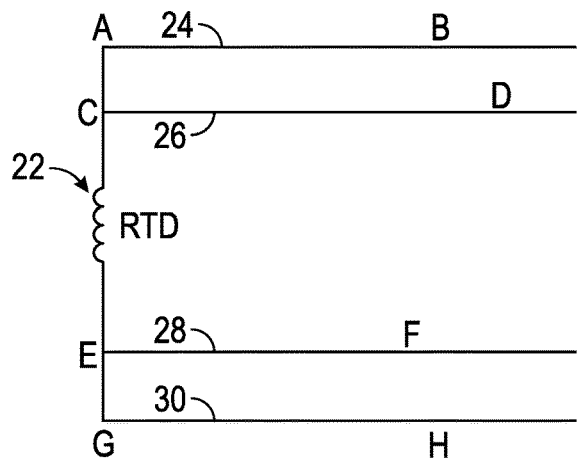
FIG. 2 illustrates a schematic diagram of the lead wires of the RTD circuit depicted in FIG. 1, in accordance with an example embodiment.

FIG. 2 illustrates a schematic diagram of the lead wires of the RTD circuit depicted in FIG. 1, in accordance with an example embodiment. Note that in FIGS. 1-2, identical or similar parts or elements are generally indicated by identical reference numerals. The resistance of lead wires will change when temperature changes. To compensate this effect in the final measurement of RTD resistance when one of the wires breaks, the following method can also be employed.

For example, when GH breaks at temperature T1, the switch over may happen to a 3-wire or a 2-wire, then $R_{AB}$ can be measured at T1 as discussed above with respect to "Lead AB Measurement". $R_{AB}$, $T_1$ is measured. Then, as follows:

$$R_{CD,T1} = R_{CD,T0} * (R_{AB,T1})/(R_{AB,T0})$$

$$R_{EF,T1} = R_{EF,T0} * (R_{AB,T1})/(R_{AB,T0})$$

$$R_{GH,T1} = R_{GH,T0} * (R_{AB,T1})(R_{AB,T0})$$

where $R_{AB,T0}$, $R_{CD,T0}$, $R_{EF,T0}$, $R_{GH,T0}$ are resistances of wires AB, CD, EF, GH at temperature T0, which is any temperature when there is no break in a 4-wire configuration.

Figure 3A:
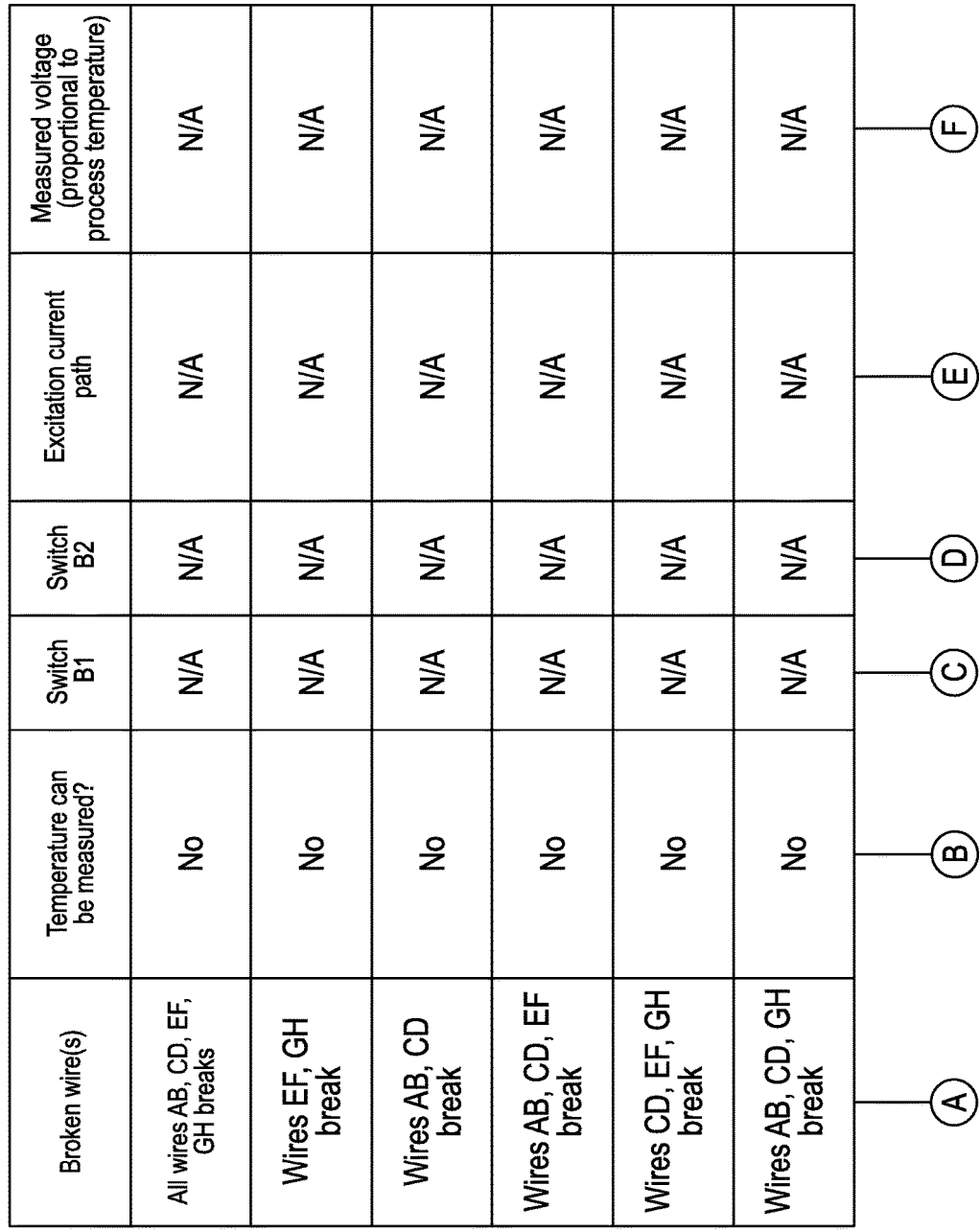
Figure 3B:
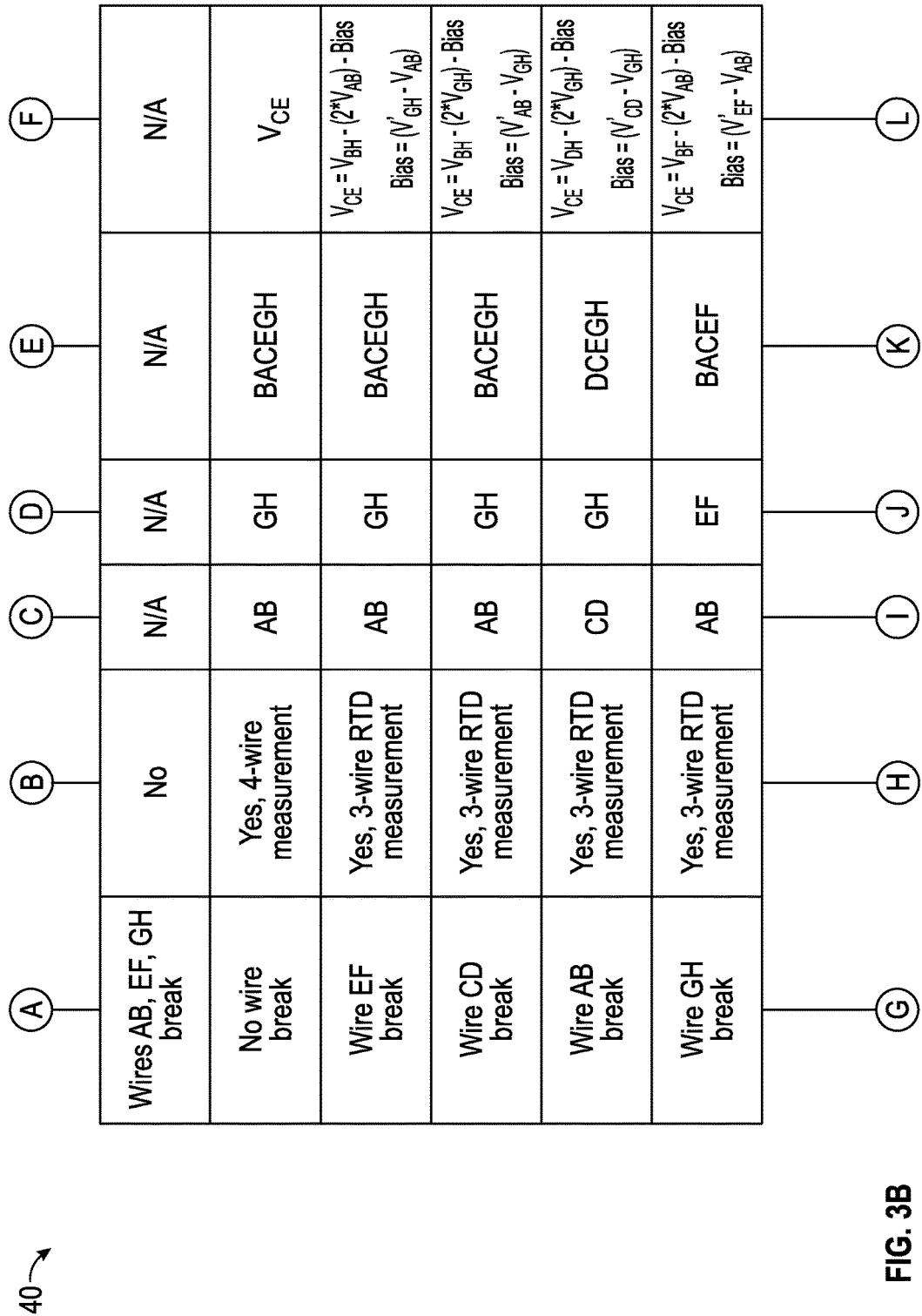

FIGS. 3A-3C illustrate a table 40 of broken wire scenarios and measurement solutions, in accordance with an example embodiment. Based on the application, a user can decide upon an action to be taken when a wire breaks. For example, when a switch is made from a 4-wire to a 3-wire or a 2-wire operation, the host can be notified using status flags. However, the process temperature measurement will continue instead of going to failsafe or burnout condition or will go to the failsafe condition. In the absence of a host, the user needs to configure the device to go to a failsafe condition when a wire breaks since the switch from 4-wire to 3-wire or 2-wire will not be detected by the user. When wire breaks are rectified, the soft-switching control can revert back from a 2-wire to a 3-wire or a 4-wire, or from a 3-wire to a 4-wire.

Figure 4A:
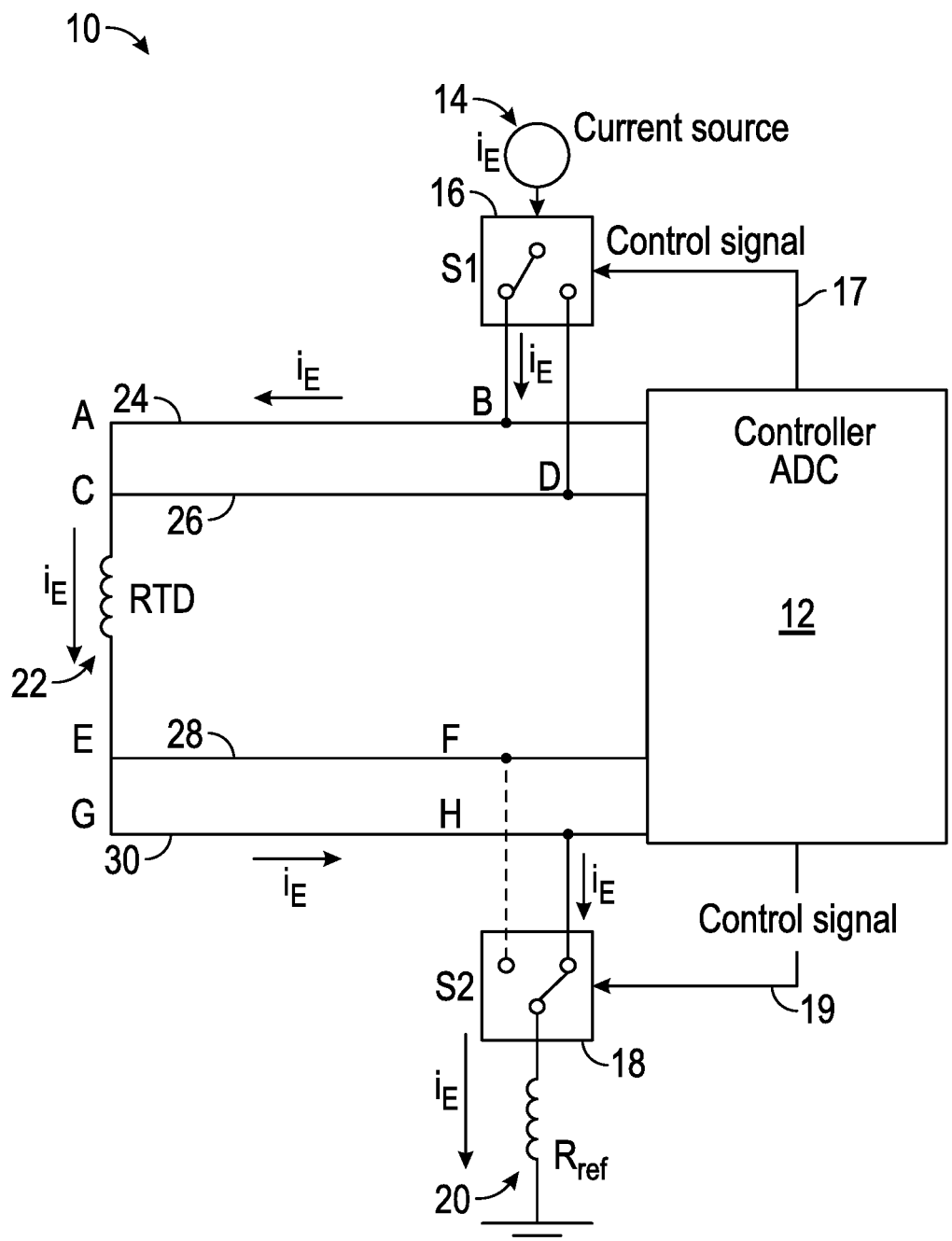
FIGS. 4A-4B illustrate the circuit shown in FIG. 1 at Time 1 and Time 2 after an example wire break, in accordance with an example embodiment.
Figure 4B:
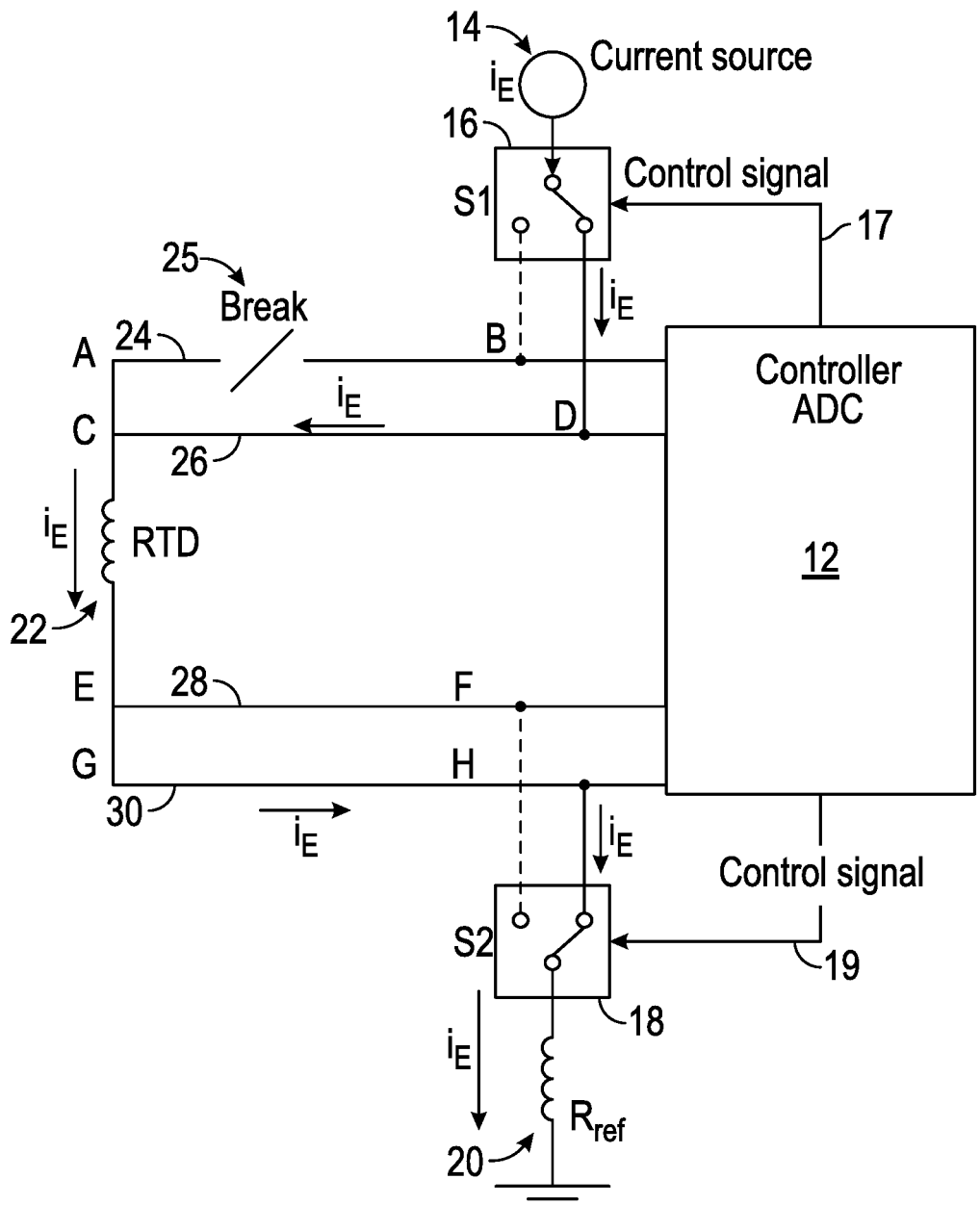

FIGS. 4A-4B illustrate the circuit 20 shown in FIG. 1 at Time 1 and Time 2 after an example wire break, in accordance with an example embodiment. Note that similar or identical parts or elements are indicated by identical reference numerals in FIGS. 1, 2, 4A, and 4B. Thus, in the example shown in FIG. 4B, if wire AB is broken (e.g., see the Time 2 circuit arrangement), the following operations are implemented:

Connect current source 14 through switch 16 to path CD and drive the excitation current source through path DCEGH.

Measure the differential voltage across DH by connecting path CD and GH to the controller ADC 12, wherein the resultant voltage is $V_{DH}$.

Measure the differential voltage across FH by connecting path EF and GH to controller ADC 12, wherein the resultant voltage is $V_{GH}$.

The following equations demonstrate these operations.

$$V_{CE} = V_{DH} - (2 * V_{GH}) - \text{Bias}$$

$$\text{Bias} = (V'_{CD} - V_{GH})$$

A number of advantages can accrue from the disclosed embodiments. For example, one advantage is that process temperature measurement continues even if 1 or 2 arms of a 4-wire RTD break. Another advantage is that downtime for process control operations is reduced. Generally, a 4-wire RTD sensor cost is high. The disclosed embodiments can reduce the costs for replacing a broken RTD (e.g., if 1 or 2 arms of RTD break) and other associated labor costs to replace sensors.

Based on the foregoing, it can be appreciated that a number of example embodiments (i.e., preferred and alternative example embodiments) are disclosed herein. For example, in one embodiment a method for sustaining process temperature measurement with respect to a lead wire break can include steps or operations such as: configuring a resistance temperature device to comprise lead wire arms including lead wire arms of a first lead wire type and a second lead wire type; and automatically switching from a first lead wire type configuration to a second lead wire type configuration in the resistance temperature device having the lead wire arms including the first lead wire type and the second lead wire type, if at least one wire break occurs in at least one arm of the lead wire arms.

The resistance temperature device can include a controller that is electrically connected to the lead wire arms. The resistance temperature device can also include a controller that is electrically connected to a current source via a first switch and to a current sink via a second switch. In another example embodiment, the resistance temperature device can include a controller that is electrically connected to the plurality of lead wire arms and to a current source via a first switch and to a current sink via a second switch, wherein the controller assists in automatically switching from the first lead wire type configuration to the second lead wire type configuration.

In some example embodiments, the aforementioned controller can be configured as a multiplexing circuit with respect to one or more analog inputs among the lead wire arms. The controller can be configured to detect one or more RTD wire breaks.

In another example embodiment, an apparatus for sustaining process temperature measurement with respect to a lead wire break can include a resistance temperature device composed of one or more lead wire arms including lead wire arms of a first lead wire type and a second lead wire type, wherein a first lead wire type configuration automatically switches to a second lead wire type configuration in the resistance temperature device having the lead wire arms including the first lead wire type and the second lead wire type, if one or more wires break occurs in one or more arms of the lead wire arms of the resistance temperature device.

In yet another example embodiment, an apparatus for sustaining process temperature measurement with respect to a lead wire break can be implemented. Such an apparatus can include a resistance temperature device configured to comprise a plurality of lead wire arms including lead wire arms of a first lead wire type and a second lead wire type, wherein a first lead wire type configuration automatically switches to a second lead wire type configuration in the resistance temperature device having the plurality of lead wire arms including the first lead wire type and the second lead wire type, if at least one wire break occurs in at least one arm of the plurality of lead wire arms of the resistance temperature device; and a controller that is electrically connected to the plurality of lead wire arms and to a current source via a first switch and to a current sink via a second switch, wherein the controller assists in automatically switching from the first lead wire type configuration to the second lead wire type configuration.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected example embodiment, even if not specifically shown or described. The same may also be varied in many ways. Such variations are not to be regarded as a departure from the disclosure and all such modifications are intended to be included within the scope of the disclosed embodiments.

The invention claimed is:

1. A method for sustaining process temperature measurement with respect to a lead wire break, said method comprising:
    configuring a resistance temperature device to comprise a plurality of lead wire arms including lead wire arms of a first lead wire type and a second lead wire type; and
    automatically switching from a first lead wire type configuration to a second lead wire type configuration in said resistance temperature device having said plurality of lead wire arms including said first lead wire type and said second lead wire type, if at least one wire break occurs in at least one arm of said plurality of lead wire arms of said resistance temperature device,
    wherein said resistance temperature device includes a controller that is electrically connected to a current source via a first switch and to a current sink via a second switch, and
    wherein said automatically switching from the first lead wire type configuration to the second lead wire type configuration includes 4 to 3, 3 to 2, 4 to 2, 2 to 4, 2 to 3, and 3 to 4 configurations based on said controller detecting a break in at least one wire arm of the plurality of wire arms.

2. The method of claim 1, wherein said resistance temperature device (RTD) configured to be a 2-wire RTD if at least one wire break occurs in at least one arm of said plurality of lead wire arms of said resistance temperature device.

3. The method of claim 1, wherein said resistance temperature device (RTD) configured to be a 3-wire RTD if at least one wire break occurs in at least one arm of said plurality of lead wire arms of said resistance temperature device.

4. The method of claim 1, wherein said resistance temperature device (RTD) comprises a 4-wire RTD.

5. The method of claim 1, wherein said resistance temperature device includes a controller that is electrically connected to said plurality of lead wire arms and to a current source via a first switch and to a current sink via a second switch, wherein said controller assists in automatically switching from said first lead wire type configuration to said second lead wire type configuration.

6. The method of claim 5, wherein said controller comprises a multiplexing circuit with respect to at least one analog input among said plurality of lead wire arms.

7. An apparatus for sustaining process temperature measurement with respect to a lead wire break, said apparatus comprising:
a resistance temperature device comprising a plurality of lead wire arms including lead wire arms of a first lead wire type and a second lead wire type; and
wherein a first lead wire type configuration automatically switches to a second lead wire type configuration in said resistance temperature device having said plurality of lead wire arms including said first lead wire type and said second lead wire type, if at least one wire break occurs in at least one arm of said plurality of lead wire arms of said resistance temperature device,
wherein said resistance temperature device includes a controller that is electrically connected to a current source via a first switch and to a current sink via a second switch, and
wherein said automatically switching from the first lead wire type configuration to the second lead wire type configuration includes 4 to 3, 3 to 2, 4 to 2, 2 to 4, 2 to 3, and 3 to 4 configurations based on said controller detecting a break in at least one wire arm of the plurality of wire arms.

8. The apparatus of claim 7, wherein said resistance temperature device includes a controller that is electrically connected to said plurality of lead wire arms.

9. The apparatus of claim 7, wherein said controller comprises a multiplexing circuit with respect to at least one analog input among said plurality of lead wire arms.

10. The apparatus of claim 7, wherein said resistance temperature device (RTD) configured to be a 2-wire RTD if at least one wire break occurs in at least one arm of said plurality of lead wire arms of said resistance temperature device.

11. The apparatus of claim 7, wherein said resistance temperature device (RTD) configured to be a 3-wire RTD if at least one wire break occurs in at least one arm of said plurality of lead wire arms of said resistance temperature device.

12. The apparatus of claim 7, wherein said resistance temperature device (RTD) comprises a 4-wire RTD.

13. An apparatus for sustaining process temperature measurement with respect to a lead wire break, said apparatus comprising:
a resistance temperature device configured to comprise a plurality of lead wire arms including lead wire arms of a first lead wire type and a second lead wire type, wherein a first lead wire type configuration automatically switches to a second lead wire type configuration in said resistance temperature device having said plurality of lead wire arms including said first lead wire type and said second lead wire type, if at least one wire break occurs in at least one arm of said plurality of lead wire arms of said resistance temperature device; and
a controller that is electrically connected to said plurality of lead wire arms and to a current source via a first switch and to a current sink via a second switch, wherein said controller assists in automatically switching from said first lead wire type configuration to said second lead wire type configuration,
wherein said automatically switching from the first lead wire type configuration to the second lead wire type configuration includes 4 to 3, 3 to 2, 4 to 2, 2 to 4, 2 to 3, and 3 to 4 configurations based on said controller detecting a break in at least one wire arm of the plurality of wire arms.

14. The apparatus of claim 13, wherein said controller comprises a multiplexing circuit with respect to at least one analog input among said plurality of lead wire arms.

* * * * *